Jan. 12, 1932. C. M. BAGSHAW 1,840,381
LASTING MACHINE
Filed Jan. 24, 1931
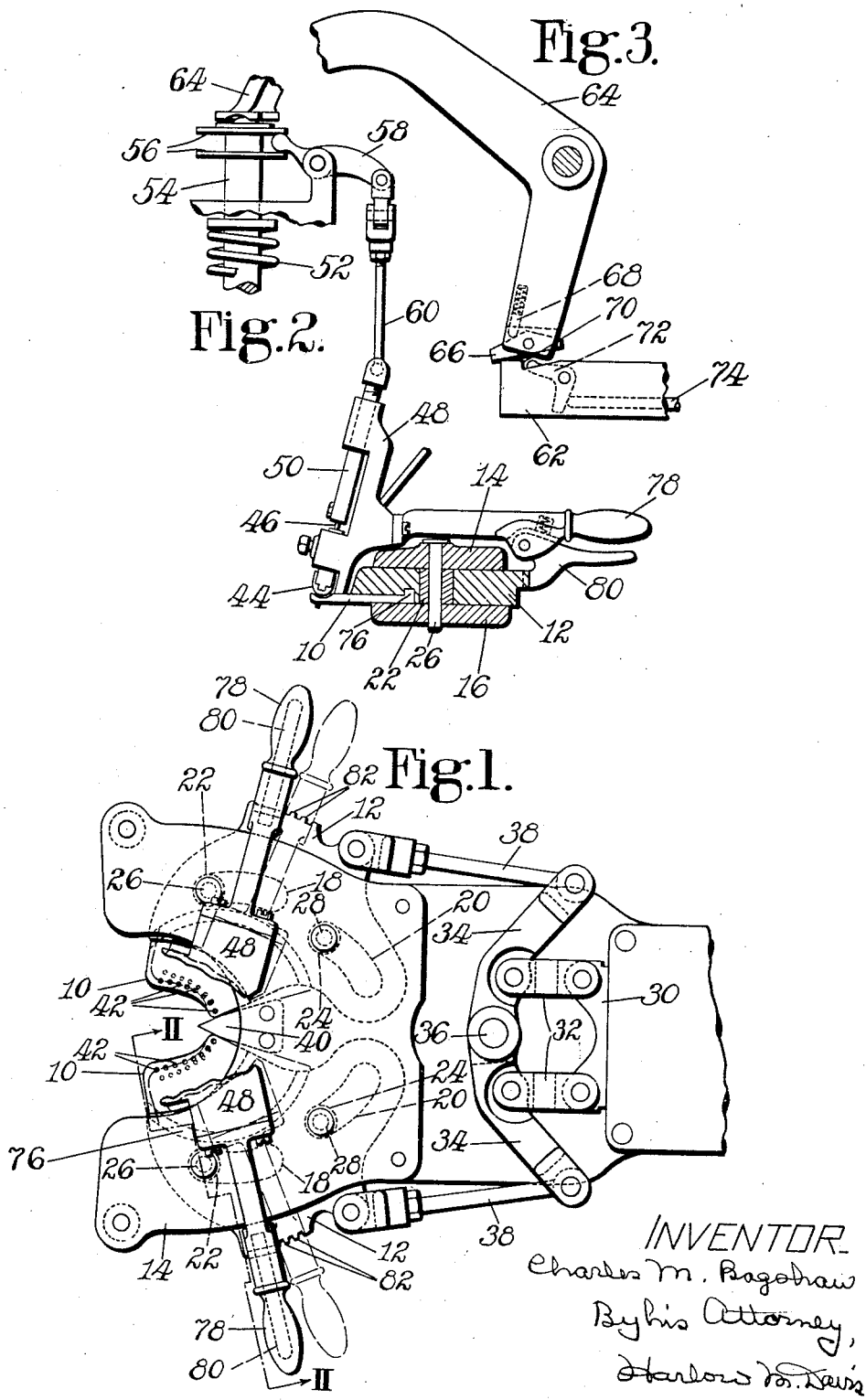
INVENTOR
Charles M. Bagshaw
By his Attorney,
Harlow D. Davis Patented Jan. 12, 1932

1,840,381

UNITED STATES PATENT OFFICE

CHARLES MARTIN BAGSHAW, OF LEICESTER, ENGLAND, ASSIGNOR TO UNITED SHOE MACHINERY CORPORATION, OF PATERSON, NEW JERSEY, A CORPORATION OF NEW JERSEY

LASTING MACHINE

Application filed January 24, 1931, Serial No. 511,033, and in Great Britain February 6, 1930.

This invention relates to machines for lasting boots and shoes (hereinafter referred to generally as shoes) and is herein illustrated as applied to a machine for lasting the heel ends of shoes, although it is to be understood that it is not thus limited in its applicability.

For the heel-end-lasting operation there have been provided heretofore machines each having a pair of wipers for wiping the heel end of the upper into lasted position, and groups of upper-fastening devices associated respectively with the different wipers for driving fastenings to fasten the upper. One object of the present invention is to provide in such an organization improvements relating especially to adjustment of the wipers and the fastening devices to position them in proper relation to shoes of different widths or to the different contours of right and left shoes. The invention is herein illustrated as applied to lasting means in which the different groups of upper-fastening devices are mounted respectively on the different wipers to move therewith and are arranged to drive the fastenings through openings in the wipers; and for the purpose in view the construction disclosed is such that each wiper and its group of fastening devices may be adjusted as a unit laterally of the shoe at the will of the operator independently of the other wiper and its fastening devices. For effecting the adjustment, as illustrated, each wiper is provided with a handle movable in fixed relation thereto, and additional means is provided for retaining each wiper in adjusted position. In a further novel aspect, the construction shown is such that the wipers and their fastening devices are adjustable relatively to wiper carriers which are movable in fixed relation to the wipers to operate them, a curved guiding connection being provided between each wiper and its carrier for the purpose of such adjustment. In accordance with still another feature, the construction disclosed provides for adjustment of each wiper and its group of upper-fastening devices about an axis located substantially at that point in relation to the wiper where the fastening is driven which is nearest the extreme end of the shoe, a special advantage in this being that the distance between the two endmost fastenings in the shoe is not affected by the adjustment. It is to be understood that in this and some other novel aspects the invention is not limited to an organization in which the different wipers are adjustable independently of each other, and further that the invention presents features of novelty in its provision for wiper adjustments regardless of the presence of fastening means in the organization.

The invention further provides an improvement in a wiper organization of that type in which the wipers move bodily toward each other while also swinging laterally of the shoe in the lasting operation, to increase the component of movement of the wiper edges laterally of the shoe as compared with their movement lengthwise of the shoe. For the purpose in view the construction shown comprises curved guiding means for so directing the wipers that they move in that manner, together with a stationary member arranged to project over the extreme end of the shoe bottom to fill the space between the wipers during their wiping movement.

The above and other features of the invention, including various novel details of construction and combinations of parts, will now be more particularly described by reference to the accompanying drawings and pointed out in the claims.

In the drawings,

Fig. 1 is a plan view of a portion of a machine in which the invention is embodied, with parts broken away;

Fig. 2 is a view partly in elevation and partly in section on the line II—II of Fig. 1; and Fig. 3 is a view in side elevation showing a part of the means for operating the upper-fastening mechanism.

The invention is herein illustrated as applied to a heel-end-lasting machine embodying in its general organization many of the features disclosed in Letters Patent No. 1,546,819, granted upon an earlier application of mine on July 21, 1925. For wiping the marginal portion of the heel end of an upper inwardly over an insole into lasted position the machine is provided with a pair of wipers 10 connected respectively to wiper carriers 12 which move in fixed relation to the wipers to operate them. Each wiper carrier is guided between fixed plates 14 and 16 and is provided with cam slots 18 and 20 within which are rolls 22 and 24 mounted respectively on pins 26 and 28 fixed in the plates 14 and 16. The rolls and the cam slots cooperate to direct the wiper carriers and the wipers in predetermined paths. For operating the wiper carriers 12 there is provided a slide 30 coupled by a pair of links 32 to arms 34 pivoted at 36 on the frame of the machine, these arms being connected by links 38 to the wiper carriers.

The cam slots 18 and 20 and the rolls 22 and 24 are so arranged that the wipers 10 receive bodily movements both lengthwise and laterally of the shoe while also swinging laterally of the shoe toward or from each other. This serves to increase the component of movement laterally of the shoe of portions of the edges of the wipers as compared, for example, with a construction in which the wipers are mounted to swing toward or from each other about a central axis, so as to avoid any undue forward bending of the margin of the upper in any location around the end of the shoe. As a result of this arrangement the wipers in their retracted positions are separated considerably from each other, as illustrated in Fig. 1; and to prevent undue gathering of the extreme rear end of the margin of the upper between the wipers there is provided a triangular plate 40 which is arranged to fill the space between the wipers and to extend inwardly over the margin of the upper on the shoe bottom at the extreme end of the shoe prior to the wiping operation. The plate 40 is fixed between the plates 14 and 16, and accordingly remains stationary during the operation of the wipers, the latter moving toward each other along and approximately in contact with the converging side edges of the plate. It will be understood that a further function of the plate 40 is to prevent any portion of the upper from being pinched between the wipers 10.

Each of the wipers 10 is provided with a series of openings 42 through which fastenings, preferably tacks, are driven for fastening the upper in lasted position, and for driving the fastenings each wiper has associated therewith a group of upper-fastening devices or tackers, comprising tack holders 44 and drivers 46. Each group of tackers in the construction shown includes a carrier 48 for the tack holders and drivers which is mounted on and secured to the corresponding wiper 10, so that the groups of tackers swing with the wipers with the tack holders and drivers always in the same relation to the corresponding openings 42 in the wipers. The drivers 46 are secured to driver bars 50 slidingly mounted in the carriers 48. The driver bars are operated to drive the tacks by a spring 52 which acts on a plunger 54 having at its upper end a groove 56 into which extend the rounded ends of levers 58 pivoted on the frame of the machine, the other ends of these levers being connected by links 60 to the upper ends of the driver bars 50. It will be understood that there is a lever 58 and a link 60 connected to each of the driver bars, and that these connections are operative in any positions that the wipers and tackers may assume.

The spring 52 and the plunger 54 are controlled by a slide 62 (Fig. 3) movable in directions lengthwise of the shoe, the slide cooperating with a bell-crank lever 64 which is pivoted on the frame of the machine and has an arm engaging the upper end of the plunger 54. The bell-crank lever 64 carries a latch 66 controlled by a spring plunger 68 and arranged to be engaged by a shoulder 70 on the slide 62 to cause the slide to act through the bell-crank lever to hold the plunger 54 in depressed position. To cause the spring 52 to act on the plunger 54 to raise the latter and thus to operate the tack driver bars 50 to drive the tacks, the latch 66 is disconnected from the shoulder 70 at the proper time in the operation of the machine by a bell-crank lever 72 which is pivoted on the slide 62 and operated by a slide 74 mounted in the slide 62. It will be understood that after the driving of the tacks the slide 62 is moved forward until the latch 66 again engages the shoulder 70 and is then retracted to depress the plunger 54 and return the driver bars 50 to their starting positions.

In the construction shown provision is afforded for adjustment of each wiper and its group of tackers as a unit laterally of the shoe at the will of the operator independently of the other wiper and its tackers, to adapt the machine to operate in the best manner on shoes of different sizes and in conformity to the different contours of right and left shoes. For the purpose in view each wiper 10 is provided along its outer edge with an arcuate rib 76 which extends into a correspondingly curved groove or guideway in the wiper carrier 12. Each rib 76 and corresponding groove in the wiper carrier are curved about an axis coincident with the rearmost tack opening 42 in the wiper, the axis being accordingly located substantially at that point in relation to the wiper where the tack is driven which is nearest the extreme end of the shoe. It will therefore be evident that the distance between the two rearmost tacks in the shoe is invariable regardless of any adjustment of the wipers and tackers. For effecting the adjustment there is secured to each tacker carrier 48 an arm or handle 78 which is accordingly positioned in fixed relation to the wiper and by the use of which the wiper and its group of tackers may be swung as a unit about the axis determined by the curved rib 76. To maintain each wiper and its group of tackers in adjusted position there is provided a spring-controlled latch 80 which is pivoted on the handle 78 and is arranged to cooperate with rack teeth 82 formed on the outer edge of the wiper carrier 12.

It will thus be seen that by the construction provided the wipers and the tackers associated therewith may be readily adjusted, not only in accordance with variations in the widths of different shoes, but also to conform in the best manner to the different contours of right and left shoes and, if desired, to position the tackers so that the tacks are driven in locations farther inwardly from the edge of the shoe bottom at one side of the shoe than at the other side. Furthermore, in addition to advantages hereinbefore discussed, adjustments of the wipers and tackers is effected without varying the limit of the advancing movement of the wipers lengthwise of the shoe.

Having described the invention, what I claim as new and desire to secure by Letters Patent of the United States is:

1. In an end-lasting machine, a pair of wipers movable to wipe an upper into lasted position about an end of a shoe, and groups of upper-fastening devices associated respectively with the different wipers and arranged to drive fastenings through the wipers to fasten the upper, each wiper and its group of upper-fastening devices being adjustable as a unit laterally of the shoe at the will of the operator independently of the other wiper and its fastening devices.

2. In an end-lasting machine, a pair of wipers movable to wipe an upper into lasted position about an end of a shoe, groups of upper-fastening devices associated respectively with the different wipers for driving fastenings to fasten the upper, each wiper and its group of upper-fastening devices being adjustable as a unit laterally of the shoe independently of the other wiper and its fastening devices, and handles movable respectively in fixed relation to the different wipers to enable the operator to effect such adjustment at will.

3. In an end-lasting machine, a pair of wipers movable to wipe an upper into lasted position about an end of a shoe, and groups of upper-fastening devices mounted respectively on the different wipers for driving fastenings to fasten the upper, each wiper and its group of upper-fastening devices being adjustable as a unit laterally of the shoe at the will of the operator independently of the other wiper and its fastening devices.

4. In an end-lasting machine, a pair of wipers movable to wipe an upper into lasted position about an end of a shoe, groups of upper-fastening devices secured respectively to the different wipers and arranged to drive fastenings through the wipers to fasten the upper, each wiper and its group of upper-fastening devices being adjustable as a unit laterally of the shoe independently of the other wiper and its fastening devices, means to enable the operator to effect such adjustment at will, and additional means for retaining each wiper in adjusted position.

5. In an end-lasting machine, a pair of wipers movable to wipe an upper into lasted position about an end of a shoe, groups of upper-fastening devices associated respectively with the different wipers for driving fastenings to fasten the upper, each wiper and its group of upper-fastening devices being mounted for swinging adjustment as a unit laterally of the shoe independently of the other wiper and its fastening devices, and means to enable the operator to effect such adjustment at will.

6. In an end-lasting machine, a pair of wipers movable to wipe an upper into lasted position about an end of a shoe, groups of upper-fastening devices associated respectively with the different wipers for driving fastenings to fasten the upper, each wiper and its group of upper-fastening devices being mounted for swinging adjustment as a unit laterally of the shoe independently of the other wiper and its fastening devices, handles connected respectively to the different wipers to enable the operator to effect such adjustment at will, and means for retaining each wiper in adjusted position.

7. In an end-lasting machine, a pair of wipers movable to wipe an upper into lasted position about an end of a shoe, wiper carriers movable respectively in fixed relation to the different wipers to operate them, and groups of upper-fastening devices associated respectively with the different wipers for driving fastenings to fasten the upper, the wipers together with their groups of upper-fastening devices being adjustable laterally of the shoe relatively to the wiper carriers.

8. In an end-lasting machine, a pair of wipers movable to wipe an upper into lasted position about an end of a shoe, wiper carriers movable respectively in fixed relation to the different wipers to operate them, and groups of upper-fastening devices associated respectively with the different wipers for driving fastenings to fasten the upper, each wiper and its group of upper-fastening devices being mounted for swinging adjustment as a unit laterally of the shoe relatively to the corresponding wiper carrier.

9. In an end-lasting machine, a pair of wipers movable to wipe an upper into lasted position about an end of a shoe, wiper carriers movable respectively in fixed relation to the different wipers to operate them, and groups of upper-fastening devices associated respectively with the different wipers for driving fastenings to fasten the upper, each wipe and its group of upper-fastening devices being adjustable as a unit laterally of the shoe relatively to the corresponding wiper carrier independently of the other wiper and its fastening devices.

10. In an end-lasting machine, a pair of wipers movable to wipe an upper into lasted position about an end of a shoe, wiper carriers movable respectively in fixed relation to the different wipers to operate them, groups of upper-fastening devices associated respectively with the different wipers for driving fastenings to fasten the upper, each wiper and its group of upper-fastening devices being mounted for swinging adjustment as a unit laterally of the shoe relatively to the corresponding wiper carrier independently of the other wiper and its fastening devices, and means for holding each wiper and its group of fastening devices in adjusted relation to the wiper carrier.

11. In an end-lasting machine, a pair of wipers movable to wipe an upper into lasted position about an end of a shoe, wiper carriers movable respectively in fixed relation to the different wipers to operate them, groups of upper-fastening devices secured respectively to the different wipers for driving fastenings to fasten the upper, and a curved guiding connection between each wiper and its wiper carrier to permit swinging adjustment of the wiper with its group of upper-fastening devices relatively to the carrier in directions widthwise of the shoe.

12. In an end-lasting machine, a pair of wipers movable to wipe an upper into lasted position about an end of a shoe, wiper carriers movable respectively in fixed relation to the different wipers to operate them, groups of upper-fastening devices mounted respectively on the different wipers for driving fastenings to fasten the upper, a curved guiding connection between each wiper and its wiper carrier to permit swinging adjustment of the wiper with its group of upper-fastening devices relatively to the carrier in directions widthwise of the shoe, and handles connected respectively to the different wipers to enable the operator to adjust them each independently of the other.

13. In an end-lasting machine, a pair of wipers movable to wipe an upper into lasted position about an end of a shoe, said wipers being adjustable laterally of the shoe each independently of the other, and handles movable respectively in fixed relation to the different wipers for adjusting them.

14. In an end-lasting machine, a pair of wipers movable to wipe an upper into lasted position about an end of a shoe, said wipers being adjustable laterally of the shoe each independently of the other, handles secured respectively to the different wipers for adjusting them, and latches for retaining the wipers in adjusted position.

15. In an end-lasting machine, a pair of wipers movable to wipe an upper into lasted position about an end of a shoe, said wipers being mounted for swinging adjustment laterally of the shoe, and handles mounted to swing with the wipers for adjusting them.

16. In an end-lasting machine, a pair of wipers movable to wipe an upper into lasted position about an end of a shoe, wiper carriers movable respectively in fixed relation to the different wipers to operate them, the wipers being adjustable laterally of the shoe relatively to the wiper carriers, and handles movable respectively in fixed relation to the different wipers for adjusting them.

17. In an end-lasting machine, a pair of wipers movable to wipe an upper into lasted position about an end of a shoe, and groups of upper-fastening devices associated respectively with the different wipers for driving fastenings to fasten the upper, each wiper and its group of upper-fastening devices being adjustable as a unit about an axis located substantially at that point in relation to the wiper where the fastening is driven which is nearest the extreme end of the shoe.

18. In an end-lasting machine, a pair of wipers movable to wipe an upper into lasted position about an end of a shoe, and groups of upper-fastening devices associated respectively with the different wipers for driving fastenings to fasten the upper, the wipers having each a series of openings therein through which the fastenings are driven, and each wiper and its group of upper-fastening devices being adjustable as a unit about an axis located at the opening therein which is nearest the extreme end of the shoe.

19. In an end-lasting machine, a pair of wipers movable to wipe an upper into lasted position about an end of a shoe, and groups of upper-fastening devices mounted respectively on the different wipers and arranged to drive fastenings through the wipers to fasten the upper, each wiper and its group of upper-fastening devices being adjustable as a unit, independently of the other wiper and its fastening devices, about an axis located substantially at that point in relation to the wiper where the fastening is driven which is nearest the extreme end of the shoe.

20. In an end-lasting machine, a pair of wipers movable to wipe an upper into lasted position about an end of a shoe, wiper carriers movable respectively in fixed relation to the different wipers to operate them, and groups of upper-fastening devices associated respectively with the different wipers for driving fastenings to fasten the upper, each wiper and its group of upper-fastening devices being adjustable as a unit relatively to the corresponding wiper carrier about an axis located substantially at that point in relation to the wiper where the fastening is driven which is nearest the extreme end of the shoe.

21. In an end-lasting machine, a pair of wipers movable to wipe an upper into lasted position about an end of a shoe, wiper carriers movable respectively in fixed relation to the different wipers to operate them, groups of upper-fastening devices mounted respectively on the different wipers for driving fastenings to fasten the upper, each wiper having a series of openings therein through which the fastenings are driven, and a curved guiding connection between each wiper and its wiper carrier to permit adjustment of the wiper with its group of upper-fastening devices relatively to the carrier about an axis located at the opening therein which is nearest the extreme end of the shoe.

22. In an end-lasting machine, a pair of wipers so controlled as to move bodily both lengthwise of a shoe and toward each other while swinging laterally of the shoe to wipe the upper into lasted position about an end of the shoe, and groups of upper-fastening devices movable respectively with the different wipers into positions to drive fastenings to fasten the upper, each wiper and its group of upper-fastening devices being adjustable as a unit about an axis located substantially at that point in relation to the wiper where the fastening is driven which is nearest the extreme end of the shoe.

23. In an end-lasting machine, a pair of wipers so controlled as to move bodily both lengthwise of a shoe and toward each other while swinging laterally of the shoe to wipe the upper into lasted position about an end of the shoe, and groups of upper-fastening devices movable respectively with the different wipers into positions to drive fastenings to fasten the upper, the wipers having each a series of openings therein through which the fastenings are driven, and each wiper and its group of upper-fastening devices being adjustable as a unit about an axis located at the opening therein which is nearest the extreme end of the shoe.

24. In an end-lasting machine, a pair of wipers so controlled as to move bodily both lengthwise of a shoe and toward each other while swinging laterally of the shoe to wipe the upper into lasted position about an end of the shoe, groups of upper-fastening devices movable respectively with the different wipers into positions to drive fastenings to fasten the upper, the wipers having each a series of openings therein through which the fastenings are driven, and wiper carriers movable respectively in fixed relation to the different wipers to operate them, each wiper and its group of upper-fastening devices being adjustable as a unit relatively to its wiper carrier, independently of the other wiper and its fastening devices, about an axis located at the opening therein which is nearest the extreme end of the shoe.

25. In an end-lasting machine, a pair of wipers for wiping an upper into lasted position about an end of a shoe, curved guiding means for directing said wipers in paths such that they move bodily lengthwise of the shoe and toward each other while swinging laterally of the shoe to wipe the upper inwardly over the shoe bottom, and a stationary member arranged to extend over the margin of the upper between said wipers at the extreme end of the shoe as the wipers are thus moved inwardly over the shoe.

26. In an end-lasting machine, a pair of wipers for wiping an upper into lasted position about an end of a shoe, curved guiding means for directing said wipers in paths such that they move bodily lengthwise of the shoe and toward each other while swinging laterally of the shoe to wipe the upper inwardly over the shoe bottom, and a member having converging side faces and arranged to extend inwardly over the margin of the upper at the extreme end of the shoe prior to the wiping operation and to maintain a stationary position between said wipers as the wipers are thus moved inwardly over the shoe.

27. In an end-lasting machine, a pair of wipers for wiping an upper into lasted position about an end of a shoe, wiper carriers on which said wipers are mounted, pin-and-slot guiding means for directing said wiper carriers in paths such that the wipers are moved bodily lengthwise of the shoe and toward each other while swinging laterally of the shoe to wipe the upper inwardly over the shoe bottom, and a member arranged to extend inwardly over the margin of the upper at the extreme end of the shoe prior to the wiping operation and to maintain a stationary position between said wipers as the wipers are thus moved inwardly over the shoe.

28. In an end-lasting machine, a pair of wipers for wiping an upper into lasted position about an end of a shoe, wiper carriers on which said wipers are mounted, and pin-and-slot guiding means for directing said wiper carriers in paths such that the wipers are moved bodily lengthwise of the shoe and toward each other while swinging laterally of the shoe to wipe the upper inwardly over the shoe bottom.

In testimony whereof I have signed my name to this specification.

CHARLES MARTIN BAGSHAW.